June 1, 1965  B. E. JONSSON  3,186,598
DISPENSING APPARATUS
Filed Dec. 14, 1961
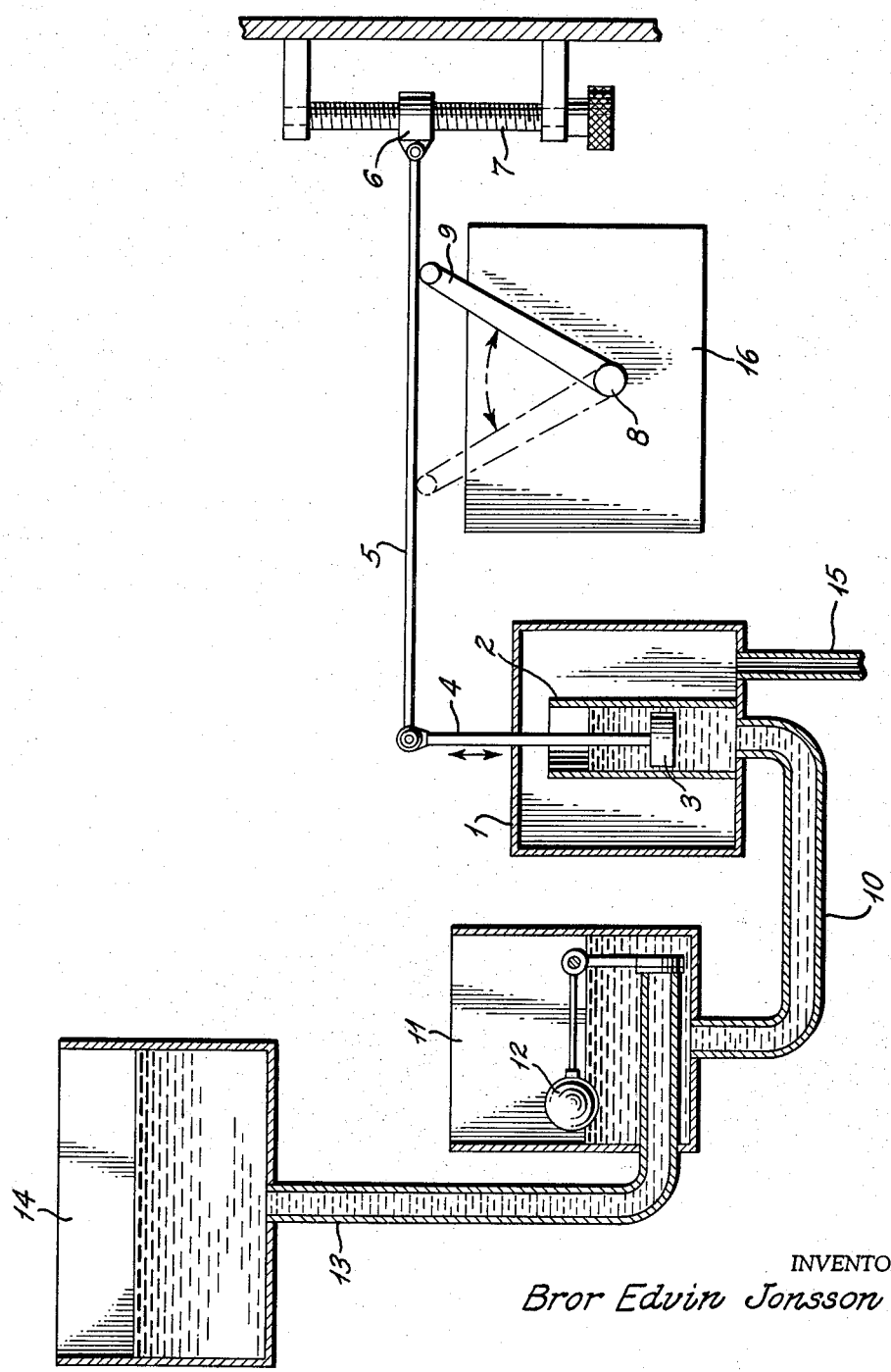
INVENTOR
Bror Edvin Jonsson
BY Stevens, Davis, Miller & Mosher
ATTORNEYS United States Patent Office 3,186,598
Patented June 1, 1965

3,186,598
DISPENSING APPARATUS
Bror Edvin Jonsson, Hargshamn, Sweden, assignor to Aktiebolaget Ewos, Sodertalje, Sweden, a corporation of Sweden
Filed Dec. 14, 1961, Ser. No. 159,310
Claims priority, application Sweden, Dec. 20, 1960, 12,304/61
6 Claims. (Cl. 222—57)

This invention relates to dispensing apparatus, especially apparatus for dispensing predetermined quantities of liquid to be used, for example, for mixing with a known quantity of a solid which is weighed out simultaneously.

It is known to mix seed-corn with a relatively small quantity of liquid in order for example to prevent fungal growth or other deterioration of the corn, and devices for measuring simultaneously the seed-corn and the liquid are known. In these known devices, the quantity of the liquid is regulated by arranging that scoops, rigidly connected to the balance shaft of a weighing machine for the corn, dip successively into a constant-level vessel containing the liquid and, when the balance shaft tilts, are emptied into an adjoining vessel from which the liquid is conducted to the weighed-out quantity of seed. This system is however not closed and consequently this method has the disadvantage that the liquid is contaminated by dust and individual seeds, with the result that the conduits become blocked and breakdowns in operation occur.

It has been attempted to eliminate these disadvantages by using sealed quantity-regulating pumps directly connected to the weighing machine. However, the considerable inertia of these constructions heavily damps the movements of the weighing machine, thus impairing the accuracy of the weighing.

In the apparatus of this invention, these disadvantages are avoided by enclosing those parts of the apparatus which the liquid touches and using a system which exerts little or no damping effect on the weighing machine.

According to the present invention, apparatus for dispensing a predetermined quantity of liquid on actuation by an external device, comprises a substantially vertical cylinder, means for supplying said cylinder with liquid to a predetermined level, a piston freely movable in said cylinder and provided with a piston rod, the free end of which is connected to a lever adapted to be swung by the action of the said external device, and a housing enclosing said cylinder and piston and adapted to receive liquid overflowing said cylinder, the said housing having an outlet for the overflowed liquid but permitting no entry of extraneous matter.

In preferred forms of the apparatus, the cylinder is supplied with liquid from a constant level reservoir in open connection with the lower end of the cylinder, the height of liquid in the cylinder and the reservoir in the normal resting position of the apparatus being the same.

The piston may simply fit loosely in the cylinder to allow liquid to flow through the space between piston and cylinder except when the piston is rapidly moved as during the actual dispensing of liquid. Alternatively the piston may comprise a non-return valve of known kind, e.g. a ball valve, which is open when the piston moves downwards and is closed when the piston moves upwards to dispense liquid. It will be understood that while the cylinder is normally of circular cross-section, it is within the scope of the invention to use "cylinders" having non-circular, e.g. oval or square, cross-sections, and the term "cylinder" as used herein should be so understood.

It is especially convenient to arrange for the fulcrum of the lever to be movable so that the length of stroke of the piston caused by the swing of the said lever can be easily varied. In this way the amount of liquid dispensed can be readily altered.

The invention will be described in more detail with reference to the accompanying drawing, in which the figure represents a diagrammatic side view in section of the dosing apparatus showing its connection to a weighing machine.

The dosing device comprises a mainly closed container 1 having fixed to the bottom thereof a vertical cylinder 2 which serves as a quantity regulating chamber. In the cylinder is a slidable piston 3 connected to a piston rod 4 which extends out of the container 1 co-axially with the cylinder. The piston rod 4 is connected pivotally to one end of a lever 5. The opposite end 6 of the lever 5 is pivotally connected to an adjustable screw 7 which enables the height of the end of the lever 5 and thus the length of stroke of the piston 3 to be adjusted. The lever 5 is actuated by a lever 9 which is rigidly connected to a balance shaft 8. On rotation of the balance shaft 8, the lever 5 is lifted and then descends again. The lever 5, the piston rod 4 and the piston 3 are of such size that they do not damp the operation of the balance. This is easily managed, since the necessary quantity of dispensed liquid is always very small in relation to the quantity of seed weighed. Generally, the weight ratio of the quantity of liquid to the quantity of seed is in the range 2:100 to 6:100. For this reason, it is advantageous to make the lever 5 of a slightly flexible material in order to eliminate any disturbances in operation which might be caused by jamming of the piston 3 against the inner surface of the cylinder 2. The cylinder 2 communicates, by means of a conduit 10 connected to the bottom of the container 1, with a constant-level vessel 11, which is provided in known manner with a float device 12 and is connected by a further conduit 13 to a supply vessel 14. The container 1 is also provided with an outlet 15 in its base.

The balance shaft 8 is a portion of a balance weighing or dispensing apparatus here indicated schematically by block 16. The balance portion of this apparatus may be of any form so long as it is capable of imparting to shaft 8 the desired rotating motion. Examples of devices suitable for performing this operation may be found in U.S. Patents 720,918 to Hesketch, 699,828 to Adolfson, and 2,793,940 to Bennet.

The quantity of liquid to be dispensed can be varied by varying the liquid level in the cylinder 2 by means of the float device 12 by shifting the length of stroke of the piston 3 by means of the screw 7, or by a combination of both. The length of stroke of the piston 3 is controlled by the arrangement of the parts of the apparatus, and since the length of the cylinder 2 is greater than the length of stroke of the piston, the latter can be adjusted with the screw 7. Thus the quantity of liquid dispensed can be varied by varying the height of the liquid column above the piston.

The device operates as follows.
At each swing of the balance shaft 8, i.e. each time a specific quantity of seed is weighed and poured out of the balance 16, the piston 3 is moved by the lever 9, operating through the lever 5. As a result, the piston is first moved upwards in the cylinder 2 and in so doing lifts the column of liquid above it into the container 1 from which the liquid runs out of the seed through the outlet 15. The piston 3 is then returned to its original position by the lever 9. Since the cylinder 2 is connected to the constant-level vessel 11, and the piston 3 is not fluid-tight in the cylinder, more liquid is introduced into the cylinder 2 up to the pre-determined height by flow through the gap between the piston and the inner wall of the cylinder.

I claim:
1. Apparatus for dispensing a predetermined quantity of liquid on actuation by an external device, said apparatus comprising a substantially vertical cylinder, means for supplying said cylinder with liquid to a predetermined level, a piston freely movable in said cylinder, a lever adapted to be swung by the action of the said external device, a piston rod connected at one end to said piston and at the other end to the said lever, a housing enclosing said cylinder and said piston and adapted to receive liquid overflowing said cylinder, and outlet means in said housing adapted to allow outflow of said overflowed liquid but to prevent entry of extraneous matter.

2. Apparatus for dispensing a predetermined quantity of liquid on actuation by an external device, said apparatus comprising a substantially vertical cylinder, a constant level reservoir in open connection with the lower end of said cylinder, a piston freely movable in said cylinder, a lever adapted to be swung by the action of the said external device, a piston rod connected at one end to said piston and at the other end to the said lever, a housing enclosing said cylinder and said piston and adapted to receive liquid overflowing said cylinder, and outlet means in said housing adapted to allow outflow of said overflowed liquid but to prevent entry of extraneous matter.

3. Apparatus for dispensing a predetermined quantity of liquid on actuation by an external device, said apparatus comprising a substantially vertical cylinder, means for supplying said cylinder with liquid to a predetermined level, a piston freely movable in said cylinder, a lever having a movable fulcrum and adapted to be swung by the action of the said external device, a piston rod connected at one end to said piston and at the other end to the said lever, a housing enclosing said cylinder and said piston and adapted to receive liquid overflowing said cylinder, and outlet means in said housing adapted to allow outflow of said overflowed liquid but to prevent entry of extraneous matter.

4. Apparatus for dispensing a predetermined quantity of liquid on actuation by an external device, said apparatus comprising a substantially vertical cylinder, a constant level reservoir in open connection with the lower end of said cylinder, a piston freely movable in said cylinder, a lever having a movable fulcrum and adapted to be swung by the action of the said external device, a piston rod connected at one end to said piston and at the other end to the said lever, a housing enclosing said cylinder and said piston and adapted to receive liquid overflowing said cylinder, and outlet means in said housing adapted to allow outflow of said overflowed liquid but to prevent entry of extraneous matter.

5. Dosing apparatus for dispensing a predetermined quantity of liquid on actuation by an external device during a weighing operation, said apparatus comprising a substantially vertical cylinder, means for supplying said cylinder with liquid to a predetermined level, a piston freely movable in said cylinder, a lever adapted to be swung by the action of the said external device, a piston rod connected at one end to said piston and at the other end to the said lever, a housing enclosing said cylinder and said piston and adapted to receive liquid overflowing said cylinder, outlet means in said housing adapted to allow outflow of said overflowed liquid but to prevent entry of extraneous matter and said external device comprising a balance adapted to swing the said lever attached to the piston rod during a weighing operation.

6. Dosing apparatus for dispensing a predetermined quantity of liquid on actuation by an external device during a weighing operation, said apparatus comprising a substantially vertical cylinder, a constant level reservoir in open connection with the lower end of said cylinder, a piston freely movable in said cylinder, a lever having a movable fulcrum and adapted to be swung by the action of the external device, a piston rod connected at one end to said piston and at the other end to the said lever, a housing enclosing said cylinder and said piston and adapted to receive liquid overflowing said cylinder, outlet means in said housing adapted to allow outflow of said overflowed liquid but to prevent entry of extraneous matter, and said external device comprising a balance adapted to swing the said lever attached to the piston rod during a weighing operation.

References Cited by the Examiner

FOREIGN PATENTS 28,586  5/07  Austria.
120,991  10/58  U.S.S.R.

LOUIS J. DEMBO, *Primary Examiner.*

LAVERNE D. GEIGER, *Examiner.*